UNITED STATES PATENT OFFICE.

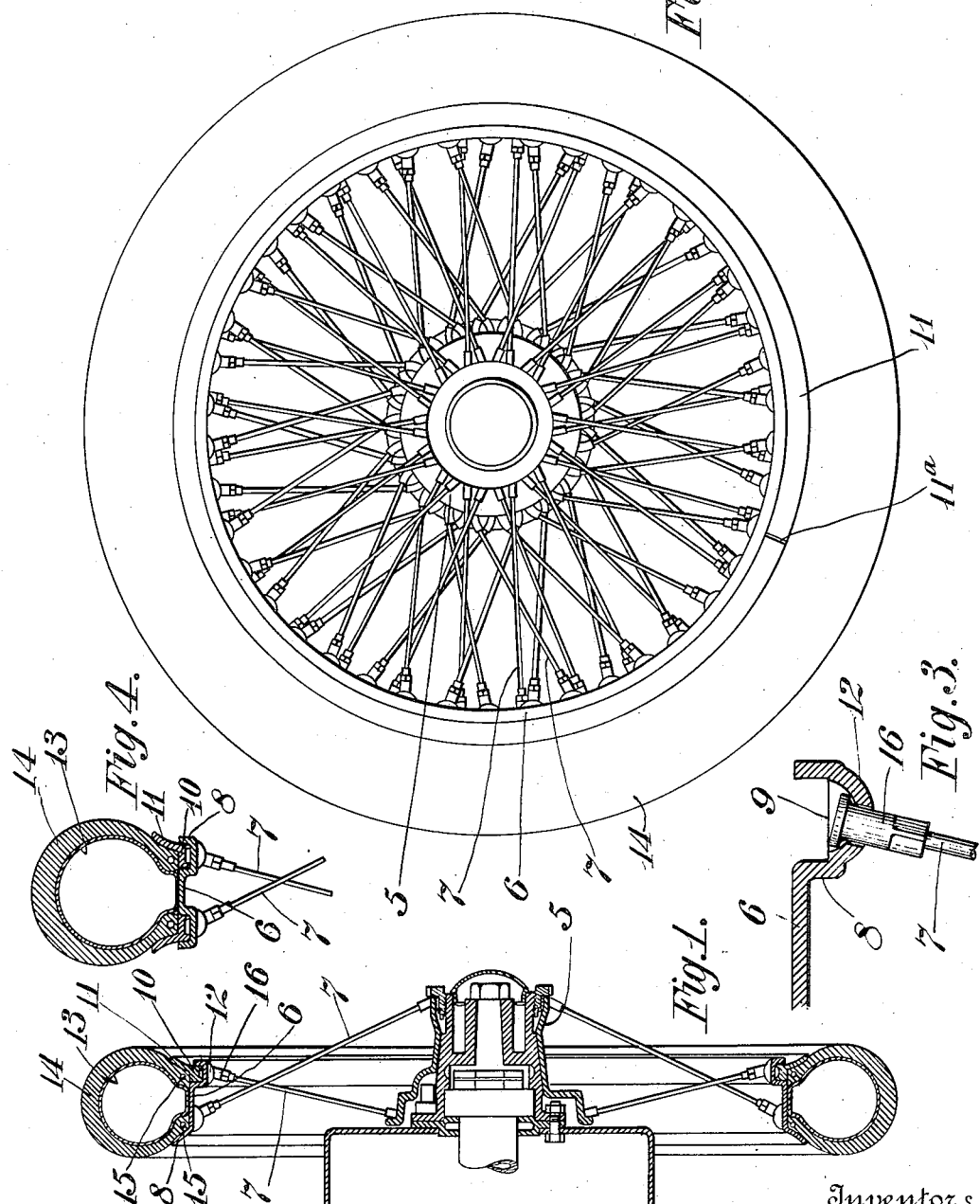

LEE A. FRAYER AND CHARLES O. HOWARD, OF COLUMBUS, OHIO, ASSIGNORS TO THE F. & H. WIRE WHEEL COMPANY, OF COLUMBUS, OHIO, A CORPORATION OF OHIO.

VEHICLE-WHEEL.

1,128,595.

Specification of Letters Patent.

Patented Feb. 16, 1915.

Application filed October 7, 1912. Serial No. 724,268.

*To all whom it may concern:*

Be it known that we, LEE A. FRAYER and CHARLES O. HOWARD, citizens of the United States, residing at Columbus, in the county of Franklin and State of Ohio, have invented a certain new and useful Improvement in Vehicle-Wheels, of which the following is a specification.

This invention relates more particularly to what are called wire wheels, that is to say wheels in which the spokes are made of slender or wire-like metal.

The invention consists of an improved construction of this sort of wheel and is embodied in the example herein shown and described, the features of novelty being pointed out in the claim.

In the accompanying drawings Figure 1 is a central vertical section of a wheel containing the invention. Fig. 2 is a side elevation looking at the right hand side of the wheel as shown in Fig. 1. Fig. 3 is a detail in section of a fraction of the rim to illustrate the construction of the channel. Fig. 4 is a detail view in section of a modified rim.

In the views 5 designates the hub of the wheel and 6 the rim, both being of metal. The rim is shown, viewed generally, as of channel form and it is supported around the hub by means of wire spokes 7, one series of spokes extending from the inner end of the hub to the outer side of the rim and the other from the outer end of the hub to the inner side of the rim.

Referring particularly to Fig. 1 the rim is shown as formed at its inner edge with a permanent or integral flange 8 and near its outer edge with an annular groove 9 depressed from the bottom of the rim and extending entirely around the rim to receive a removable ring to form the opposite flange of the rim. This removable ring is a split or open ring adapted to be sprung into the annular groove 9. This ring is comprised of a horizontal base portion 10 that fits in the groove 9 and has its upper face flush with the surface of the bottom of the rim and an outwardly extending portion 11 that constitutes the flange. When the flange ring is of full length its ends will come quite close together, as seen at 11ᵃ. The outer ends of the spokes are secured by nipples such as seen at 16 Fig. 3 in depressions 12 in the left hand or inner side of the rim and in the bottom of the groove 9 or in similar depressions 12 therein at the right hand side of the rim. But the ends can be riveted in an ordinary manner if desired.

13 designates the inner tube of the inflatable tire and 14 the shoe of such a tire, the shoe having continuous rings of wire 15, 15 embedded around its edges. In this construction it will be observed that when the tire is inflated the edges of the shoe are pressed laterally into the corner of the flange ring and the corner formed by the integral flange and the bottom of the rim and that the ring is thereby held firmly locked in its seat. In these circumstances the flange ring requires no other means for securing it in place.

In Fig. 4 a removable flange ring is shown at each side of the wheel, that is to say, each side of the rim is provided with a circumferential or annular groove in which is seated a removable flange ring.

The tire is easily removed by first deflating it and then removing the ring flange, after which the tire can be slid off laterally. Where there are two removable flange rings the tire can be removed after the removal of the flange ring from either side.

Features of novelty herein shown and described but not claimed herein are claimed in an application pending concurrently herewith filed October 17, 1912, S. No. 726,258.

As appears in Fig. 1, the wire wheel is particularly adapted to fit into the standard wheel construction, and by reason of this fact, in order that this may be done without the necessity of making any change in the automobile to which the wheel is to be applied, we have formed the wheel of peculiar construction for the purpose of permitting the brake-drum to be placed as near the center of the wheel as practicable. To this end, the inner end of the hub is located substantially in the same vertical plane as the rim of the wheel while the outer end of the hub is extended outwardly beyond the outer side of the wheel proper. By this construction, the brake-drum may be located close to the center of the wheel; for instance, in the wheel from which the drawings of this application were made, the brake-drum is located substantially seven-eighths of an inch from the center of the wheel. One series of spokes are connected to the outer end of the hub and to the inner side of the rim, while the other series of spokes are connected to the inner end of the hub and the outer side of the rim.

What we claim is—

In a wheel of the kind described, the combination of a rim, one side of said rim being formed with a circumferential groove, a hub, spokes having their outer ends seated in said groove, said spokes extending from said groove inwardly to a point on the hub substantially coincident with a central vertical plane through said wheel and secured to said hub at said point, and a tire retaining ring also seated in said groove.

LEE A. FRAYER.
CHARLES O. HOWARD.

Witnesses to both signatures:
BENJAMIN FINCKEL,
GEORGE M. FINCKEL.